US012650111B2

(12) United States Patent
Hansen et al.

(10) Patent No.: US 12,650,111 B2
(45) Date of Patent: Jun. 9, 2026

(54) WIND TURBINE BLADE REPAIR

(71) Applicant: LM Wind Power A/S, Kolding (DK)

(72) Inventors: Lars Bo Hansen, Kolding (DK);
Othman Al-Khudairi, Woking (GB)

(73) Assignee: **GE Vernova Infrastructure
Technology LLC**, Greenville, SC (US)

( * ) Notice: Subject to any disclaimer, the term of this
patent is extended or adjusted under 35
U.S.C. 154(b) by 0 days.

(21) Appl. No.: 18/860,147

(22) PCT Filed: Apr. 24, 2023

(86) PCT No.: PCT/EP2023/060606
§ 371 (c)(1),
(2) Date: Oct. 25, 2024

(87) PCT Pub. No.: WO2023/208821
PCT Pub. Date: Nov. 2, 2023

(65) Prior Publication Data
US 2025/0290491 A1 Sep. 18, 2025

(30) Foreign Application Priority Data
Apr. 26, 2022 (GB) ..................................... 2206057

(51) Int. Cl.
*F03D 80/50* (2016.01)
*F03D 80/30* (2016.01)
*F03D 80/40* (2016.01)

(52) U.S. Cl.
CPC ......... *F03D 80/502* (2023.08); *F03D 80/301*
(2023.08); *F03D 80/401* (2023.08)

(58) Field of Classification Search
CPC ..... F03D 80/502; F03D 80/301; F03D 80/401
See application file for complete search history.

(56) References Cited

U.S. PATENT DOCUMENTS

| | | | |
|---|---|---|---|
| 10,066,608 | B2 | 9/2018 | Krueger et al. |
| 2009/0053406 | A1 | 2/2009 | Ackerman |

FOREIGN PATENT DOCUMENTS

| | | | |
|---|---|---|---|
| EP | 2963289 | A1 | 1/2016 |
| WO | WO2022/043487 | A1 | 3/2022 |

OTHER PUBLICATIONS

PCT International Search Report PCT/EP2023/060606 dated Jul.
14, 2023.
LOCTITE, LOCTITE Ablestik 57C, Technical Data Sheet ED-14384-
A2, Mar. 2020. Retrieved Oct. 21, 2024 from weblink: https://www.
mouser.com/datasheet/2/773/LOCTITE_ABLESTIK_57C_en_GL-
3433132.pdf?srsltid=AfmBOorN96hoh6N_doy1-
u83RjbuYaW3IoSJIwa182s5_7j16ZxIqsi3.

*Primary Examiner* — Moshe Wilensky
(74) *Attorney, Agent, or Firm* — Dority & Manning, P.A.

(57) ABSTRACT

The present invention provides a method of repairing a
metal mesh in a wind turbine blade part, damaged for
instance by a lightning strike. The method comprises pro-
viding a wind turbine blade part; exposing a first metal mesh
comprised in the wind turbine blade part; adhesively attach-
ing a second metal mesh to the first metal mesh using an
electrically conductive adhesive, such that the second metal
mesh at least partially overlaps the first metal mesh; and
covering the second metal mesh with cover material to
finalise the repair. A corresponding wind turbine blade part
is also provided.

14 Claims, 9 Drawing Sheets

SECTION I-I:

Fig. 13a                                    Fig. 13b

WIND TURBINE BLADE REPAIR

RELATED APPLICATIONS

The present application claims priority to PCT Application Number PCT/EP2023/060606, filed Apr. 24, 2023, which claims the benefit of GB Patent Application No. 2206057.8, filed Apr. 26, 2022. Both applications are incorporated by reference herein in their entirety.

BACKGROUND OF THE INVENTION

As wind turbines and wind turbine blades increase in size, the risk of lightning striking the wind turbine blades increases. It is therefore of increasing interest to provide wind turbines and in particular wind turbine blades with lightning protection measures.

Lightning protection measures in a wind turbine blade typically include metal lightning receptors exposed at the outer surface of the blade to attract lightning in case of a lightning strike. The lightning receptors are typically connected to ground through metal conductors in order to prevent lightning current from flashing over between less conductive parts of the blade, which would cause heating and potentially damage those parts. Typically, blades include a downconductor cable extending substantially the entire length of the blades. The downconductor cable is typically coupled to several lightning receptors arranged along the length of the blade to reduce the risk of flashovers into the blade during a lightning strike.

As blade sizes increase, a need also arises to manufacture blades having increased rigidity while not increasing the weight too much. One way of achieving these properties is to combine various kinds of fibres in the laminate of the blades, such as in spar caps. For instance, it is an option to combine glass fibres and carbon fibres, or to make certain components only from carbon fibre composite. However, a high amount of carbon fibre in composite structural elements, such as spar caps, increases the risk of flashover because carbon fibres are conductive enough that lightning current can flow in the carbon spar caps during a lightning strike. This would cause substantial heating and could result in structural damage to the carbon fibre composite as well as surrounding parts close to or adjoining the spar cap. This may result in delamination between different types of composites, such as interfaces between carbon fibre composites and glass fibre composites. This is in part due to the difference in their mechanical, thermal, and electrical properties of the different types of composites.

To protect such parts, a metal layer near the surface of the wind turbine may be included. The metal layer is typically connected to ground, for instance via the downconductor mentioned above, allowing lightning current to be conducted to ground with (relatively) low resistance. Such a metal layer may protect for instance carbon spar caps.

The tip of a wind turbine blade is particularly susceptible to lightning strikes. A lightning receptor is therefore usually included near the tip. A metal layer near the surface may provide additional protection against damage from a lightning strike. Such a layer may extend all the way to the tip where the risk of lightning strike is high.

However, such a metal layer can be damaged during lightning strike and can also be damaged during transport of the wind turbine blade. During transport, a wind turbine blade usually rests on relatively small areas of the blade, and the pressure exerted on those areas is thus very high. During the transport, the blade moves to some extent, which can cause damage to those areas of the blade that support the entire blade. Such damage includes damage to the coating. However, other layers are also damaged. Since the lightning protection metal layer is usually close to the outer surface, the metal layer may also be damaged.

Thus, there is a need to address damage to metal layers in wind turbine blade parts, be it damage from a lightning strike or damage caused by transport.

SUMMARY OF THE INVENTION

It is an object of the present invention to mitigate one or more of the issues described above.

In a first aspect, the present invention provides a method for repairing a wind turbine blade part. The method comprises:

providing a wind turbine blade part, exposing a first metal mesh comprised in the wind turbine blade part, adhesively attaching a second metal mesh to the first metal mesh using an electrically conductive adhesive, such that the second metal mesh at least partially overlaps the first metal mesh, and covering the second metal mesh with cover material, such as a fibre-reinforcement material and/or a coating, to finalise the repair.

The present invention allows damages in original metal meshes in wind turbine blade parts to be repaired to such a state that the original electrical properties are reestablished. An issue in the prior art is that if original metal meshes were to be repaired, soldering was required, which would involve elevated temperatures. High temperatures would cause significant damage. Thus, repair of metal meshes in wind turbine blade parts was effectively not possible. Thus, damaged blades tended to either be discarded or to be only cosmetically repaired. This led to a waste of materials and time or to an inferior product. The present invention eliminates or at least mitigates these issues, allowing relatively cheap repair and reducing waste of resources and time, and providing a repaired product that is essentially at par with the original or intended product.

In some embodiments, the exposed first metal mesh comprises a defect, such as a damaged portion. A defect may for instance be the result of a lightning strike or a manufacturing error or it may result from transport of the wind turbine blade part, as described in the background. The present invention can address either of these problems. To repair the defect, whatever the source of the defect is, the step of attaching the second metal mesh may comprise covering at least the defect with the second metal mesh such as to patch the defect.

In some embodiments, the method further comprises:

reducing a thickness of the first metal mesh around the defect to produce an area in which the first metal mesh has a reduced thickness, providing the second metal mesh in a size that corresponds to the defect and at least part of the area in which the first metal mesh has a reduced thickness, and attaching the second metal mesh overlapping the defect and the at least part of the area of reduced thickness, thereby obtaining a patched area having a thickness that is smaller than a combined thickness of the first metal mesh and the second metal mesh before the step of reducing the thickness of the first metal mesh around the defect.

In a more general formulation, a metal element can be used for the repair. For instance, the metal element could be a non-meshed metal plate. That is, instead of a second metal mesh, a metal plate is provided. A mesh has a lower weight compared to a non-meshed metal plate of the same area, which is an advantage. On the other hand, using a metal plate may result in a lower resistance in the repaired region.

Reducing the thickness of the first metal mesh is typically required, since the first metal mesh is embedded in resin during the original manufacturing of the wind turbine blade part. Thus, the first metal mesh is typically not significantly exposed, and the electrical connection between the first metal mesh and the second metal mesh will be poor. By reducing a thickness of the first metal mesh, even if by a small fraction, resin together with metal is removed, and the first metal mesh will be exposed. This allows a low-resistance connection between the first metal mesh and the second metal mesh.

In some embodiments, the second metal mesh has a part corresponding to the defect and a surrounding part that surrounds the part corresponding to the defect, and the method further comprises:

reducing a thickness of the second metal mesh in one or more areas of the surrounding part, and
    attaching the second metal mesh to the first metal mesh such that the part of the second metal mesh that corresponds to the defect overlaps the defect and such that the one or more areas of reduced thickness overlap a corresponding part of the first metal mesh outside the defect, thereby obtaining a patched area having a thickness that is smaller than a combined thickness of the first metal mesh and the second metal mesh before the step of reducing the thickness of the second metal mesh in the one or more areas of the surrounding part of the second metal mesh.

This has the advantage that at least some of the missing metal mesh is replaced. This can reduce the resistance in the repaired region, bringing the electrical properties closer to those that prevailed before the damage.

In some embodiments, the thickness of the first metal mesh and/or the second metal mesh is reduced by 20-80%, such as by 30-70%, such as by 40-60%, such as by 50%. By removing a large portion of the thickness of the first metal mesh, two metal meshes of the same thickness can be combined to produce a repaired layer having combined thickness close to the original thickness of the first metal mesh. Reducing the thickness of the first metal mesh by half allows the use of a second metal mesh having a thickness of half the thickness of the first metal mesh, resulting in a repaired metal mesh having a thickness that is substantially the thickness of the original first metal mesh. In another embodiment, most of the thickness of the first metal mesh is removed, which allows for adding a second metal mesh having the same thickness as the original first metal mesh and ending up with a repaired metal mesh having a thickness substantially equal to the thickness of the original first metal mesh.

In some embodiments, the wind turbine blade part comprises a portion to be repaired, the portion to be repaired being located beneath the first metal mesh. In some cases, the first metal mesh is deliberately damaged because a part of the blade beneath (seen from the outer surface of the wind turbine blade part) the first metal mesh needs repair. In that case, a cavity must be formed in order to access the region to be repaired. For instance, an air pocket may be present due to incomplete impregnation during infusion of resin in the manufacturing of the wind turbine blade part. After the manufacturing, an air pocket may be identified for instance using an ultrasound scanner. Since the first metal mesh is often embedded close to the surface of the wind turbine blade part, it may be necessary to remove part of the first metal mesh in order to access the air pocket to reinforce it. In such cases, the method further comprises, before the step of adhesively attaching the second metal mesh to the first metal mesh:

removing a part of the wind turbine blade part including a part of the first metal mesh, to expose the portion to be repaired, and
    repairing the portion to be repaired.

In some embodiments, the step of covering the second metal mesh completes an aerodynamic profile of the wind turbine blade part in a vicinity of the first and the second metal meshes. This ensures that the repair of the first metal mesh does not cause undesired aerodynamic properties, such as undesired turbulence or reduced lift or increased drag.

In some embodiments, the step of covering the second metal mesh comprises:

applying one or more fibre layers and adding resin to embed the fibre layers to form a composite, and/or
    applying leading edge protection means on a surface of the wind turbine blade part, and/or
    applying a coating to the wind turbine blade part.

Applying one or more fibre layers and adding resin to embed the fibre layers to form a composite can be used to reestablish composite material removed during the repair, either in front of the first metal mesh (closer to the outer surface of the wind turbine blade part compared to the first metal mesh) or beneath the first metal mesh (further from the outer surface of the wind turbine blade part compared to the first metal mesh).

In some embodiments, the first metal mesh and/or the second metal mesh is made of copper or copper alloy.

In some embodiments, the electrically conductive adhesive has an electrical resistivity which is less than $1.0 \cdot 10^{-5}$ Ohm-meter, such as less than $7.0 \cdot 10^{-6}$ Ohm-meter, such as less than $5.0 \cdot 10^{-6}$ Ohm-meter, such as less than $3.0 \cdot 10^{-6}$ Ohm-meter, such as less than $2.0 \cdot 10^{-6}$ Ohm-meter, such as less than $1.0 \cdot 10^{-6}$ Ohm-meter, measured at 25° C. These values are lower than the resistivities of different metals, but the inventors have found that the values above give a good electrical performance of the repaired metal mesh while still allowing the electrically conductive adhesive to have enough mechanical strength.

In some embodiments, the wind turbine blade part comprises a wind turbine blade having a leading edge and a trailing edge, or the wind turbine blade part comprises a wind turbine blade segment having a leading edge and a trailing edge. Both an entire wind turbine blade and a wind turbine blade segment of a segmented wind turbine blade may be damaged, either by lightning or during transport. The present invention allows wind turbine blade parts to be repaired rather easily, even at the installation location, and avoids the need to scrap entire blades or blade segments.

In some embodiments, the exposed first metal mesh is located at a chordwise position x which is at most 25% from a leading edge (x<0.25 c) of the wind turbine blade, such as at most 20% from a leading edge (x<0.25 c) of the wind turbine blade. These positions along the chord are quite susceptible to damage both from lightning and from transport (in case the transport is performed leading-edge down).

In some embodiments, the wind turbine blade part comprises a wind turbine blade and the exposed first metal mesh is located at a spanwise position (i.e. along a longitudinal axis from the root end of the blade to the tip end of the blade), the spanwise position being within an outermost 25% of the blade (that is, the position is within 25% of the longitudinal length from the tip).

In some embodiments, the first metal mesh is part of a lightning protection system in the wind turbine blade part. Such systems frequently include a metal mesh close to the outer surface of the wind turbine blade part, which means that the metal mesh is very susceptible to damage in case of a lightning strike in a region where there is a metal mesh. Although the metal mesh is susceptible to damage, the very purpose of the metal mesh may be to avoid damage to more fragile parts during a lightning strike.

In some embodiments, the wind turbine blade part comprises a heating element for de-icing the wind turbine blade part.

In some embodiments, the method further includes a step of providing strengthening material, such as one or more adhesives, in such a way that after the step of finalising the repair, there are no voids, or at least substantially no voids, in a vicinity of the second metal mesh. The one or more adhesives may include one or more of a non-conductive adhesive and an electrically conductive adhesive. This increases the mechanical strength of the repair.

A combination of different adhesives may be used to fill different regions. A non-conductive adhesive has the advantage of being cheaper. An electrically conductive adhesive is more expensive but may result in a lower resistance between the new metal mesh and the damaged metal mesh. By using both conductive and non-conductive adhesives, a balance can be struck that takes advantage of the (relative) cheapness of the non-conductive adhesive and the electrical conductivity of the electrically conductive adhesive.

In some embodiments, the method further includes a step of providing strengthening material, such as one or more adhesives, in such a way that after the step of finalising the repair, there are no voids, or at least substantially no voids, between the cover material and the first metal mesh. This has the advantages described in the preceding paragraph.

In some embodiments, an overlap between the second metal mesh and the first metal mesh is at least 20 mm, such as at least 30 mm, such as at least 40 mm, such as at least 50 mm. In some embodiments, the overlap is in the range 20-50 mm. In some embodiments, electrically conductive adhesive is applied only in the overlapping region. This provides sufficient mechanical bonding and ensures a sufficiently low resistance while keeping costs down. Preferably, this overlap is provided at least for 30% of an entire circumference of the second metal mesh, such as at least 50% of the entire circumference. The resulting area of contact between the first metal mesh and the second metal mesh will then be sufficient for obtaining an electrical resistance low enough for the repaired region not to exhibit adverse effects in case of a lightning strike compared to undamaged regions.

A second aspect of the invention provides a wind turbine blade part obtainable by a method in accordance with the first aspect of the invention. Such a blade is distinguished from known blades by the presence of electrically conductive adhesive, adhesively attaching the second metal mesh to the first metal mesh somewhere in the wind turbine blade part.

In a third aspect, the invention provides a wind turbine blade part comprising a first metal mesh and a second metal mesh, wherein the second metal mesh at least partially overlaps the first metal mesh, and wherein the second metal mesh is adhesively attached to the first metal mesh using an electrically conductive adhesive.

6

In some embodiments, the second metal mesh is adhesively attached to patch a defect in the first metal mesh, such as a damaged area of the first metal mesh.

In some embodiments, the electrically conductive adhesive has an electrical resistivity which is less than $1.0 \cdot 10^{-5}$ Ohm-meter, such as less than $7.0 \cdot 10^{-6}$ Ohm-meter, such as less than $5.0 \cdot 10^{-6}$ Ohm-meter, such as less than $3.0 \cdot 10^{-6}$ Ohm-meter, such as less than $2.0 \cdot 10^{-6}$ Ohm-meter, such as less than $1.0 \cdot 10^{-6}$ Ohm-meter, measured at 25° C.

In a fourth aspect, a (non-meshed) metal plate is used for the repair. That is, the fourth aspect provides a method for repairing a wind turbine blade part, comprising:

providing a wind turbine blade part, exposing a first metal mesh comprised in the wind turbine blade part, adhesively attaching a metal plate to the first metal mesh using an electrically conductive adhesive, such that the metal plate at least partially overlaps the first metal mesh, and covering the metal plate with cover material, such as a fibre-reinforcement material and/or a coating, to finalise the repair.

The use of a metal plate results in a lower resistance in the repaired region compared to that which is obtained using a metal mesh.

A fifth aspect provides a wind turbine blade part repaired using a method in accordance with the fourth aspect.

The advantages discussed in relation to the first aspect of the invention apply equally to the second, third, fourth, and fifth aspects of the invention.

BRIEF DESCRIPTION OF THE DRAWINGS

The invention is explained in detail below with reference to the embodiments shown in the drawings.

FIGS. 13a-13c illustrate another embodiment of the repair method.

DETAILED DESCRIPTION OF SELECTED EMBODIMENTS

Figure 1:
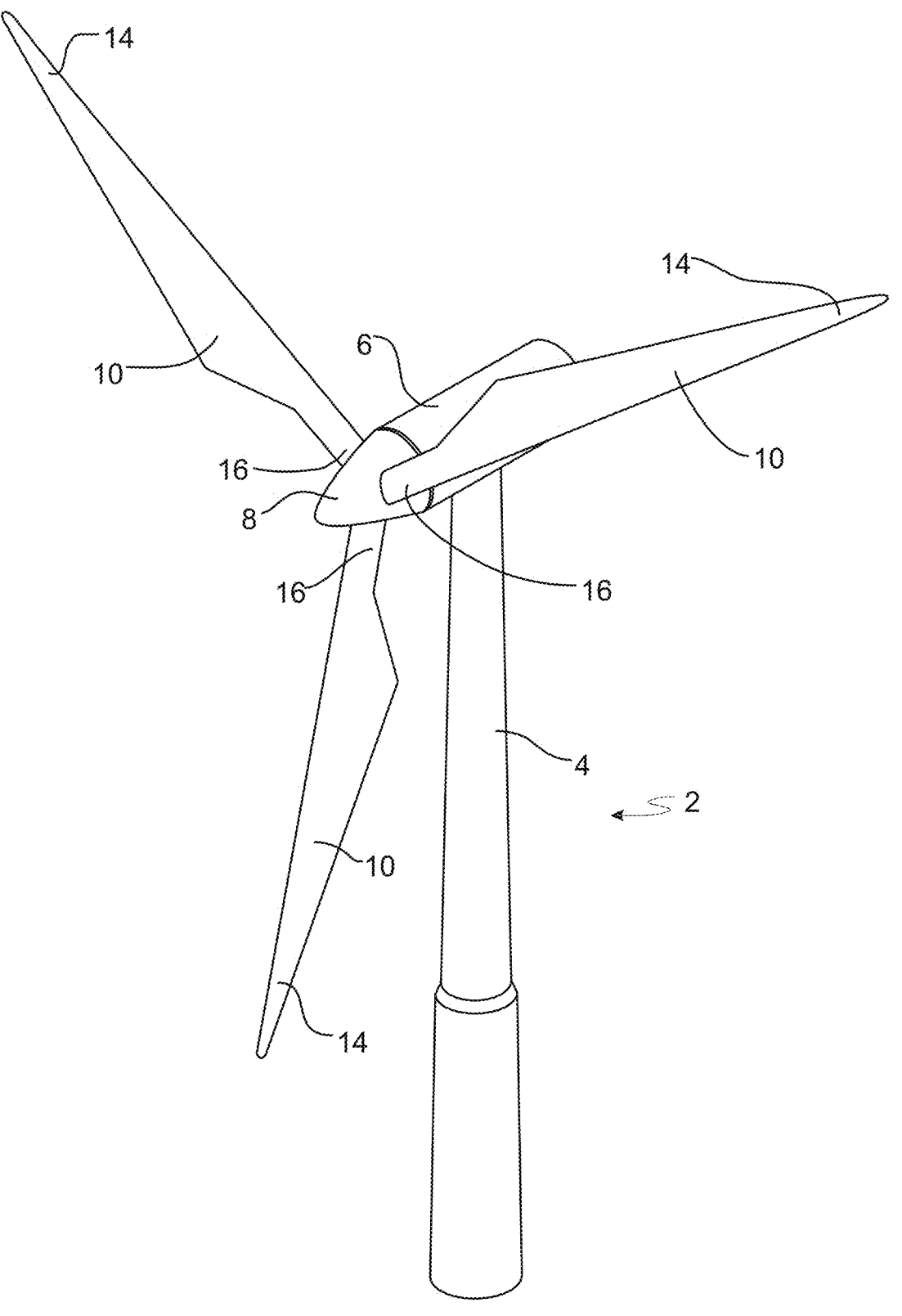
FIG. 1 illustrates a wind turbine.

Embodiments of the invention will be described in more detail in the following with reference to the accompanying drawings. Like reference numerals may refer to like elements throughout. The drawings show selected ways of implementing the present invention and are not to be construed as limiting the scope of the claims. The features in the drawings, including the sizes and thicknesses of the layers 41-49 described below, are not necessarily drawn to scale.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
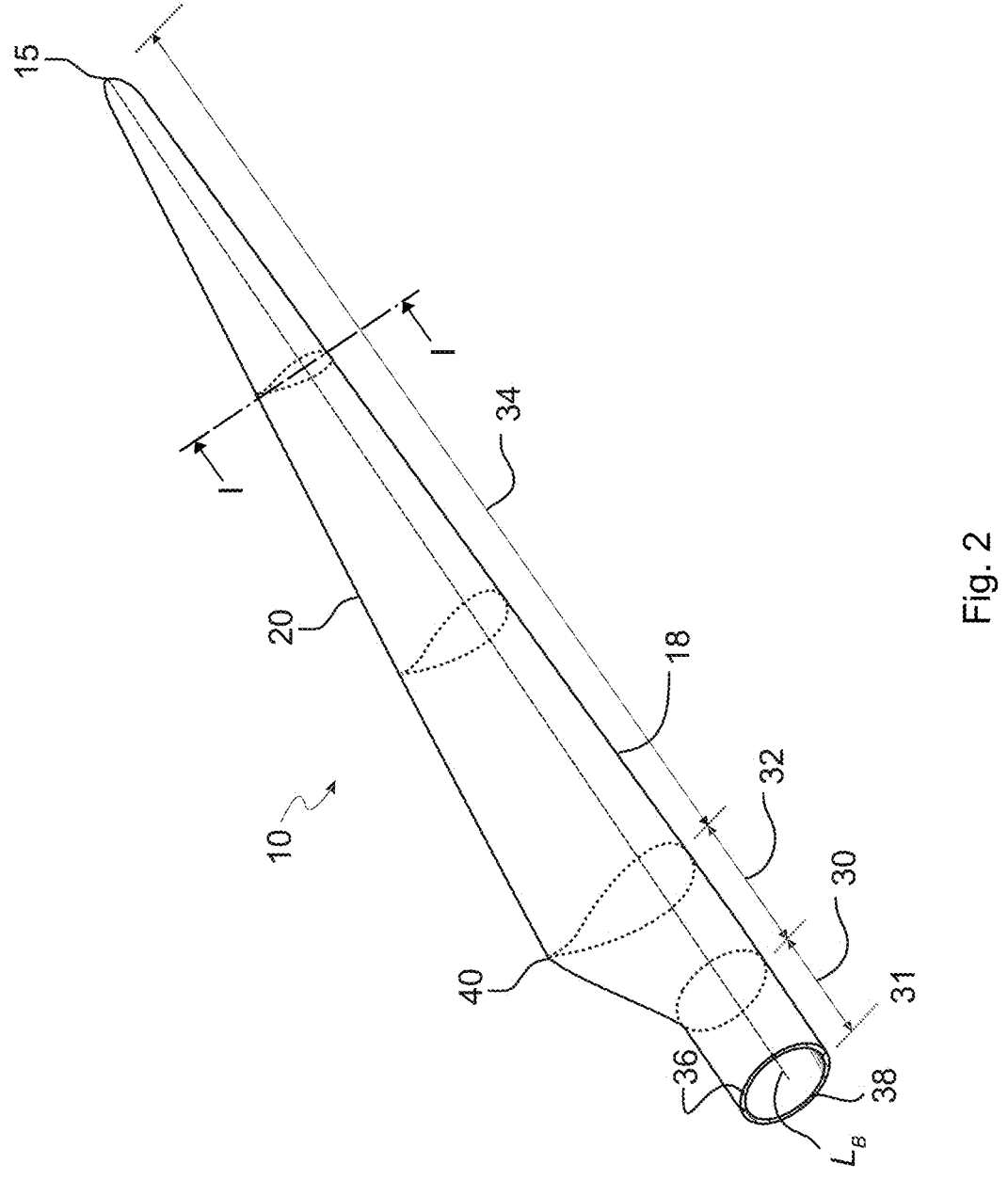
FIG. 2 illustrates a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15, located opposite the root end 31 that attaches to the wind turbine hub 8.

The airfoil region 34, also called the profiled region, of the wind turbine blade has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant or may vary along the root region 30. The transition region 32 has a transitional profile gradually changing from the circular or elliptical shape of the root region 30 to the airfoil profile of the airfoil region 34. The chord length of the transition region 32 typically increases with increasing distance from the hub. The airfoil region 34 has an airfoil profile with a chord that extends between the leading edge 18 and the trailing edge 20 of the blade 10. The chord usually decreases with increasing distance from the hub.

A shoulder 40 of the blade 10 is defined as the position where the blade 10 has its largest chord length. The shoulder 40 is typically located at the boundary between the transition region 32 and the airfoil region 34. FIG. 2 also illustrates the longitudinal extent Ls of the blade 10. La also represents a longitudinal axis of the blade 10.

The blade is typically made from a pressure side shell part 36 and a suction side shell part 38 that are glued to each other along bond lines at the leading edge 18 and the trailing edge 20 of the blade 10.

Figure 3:
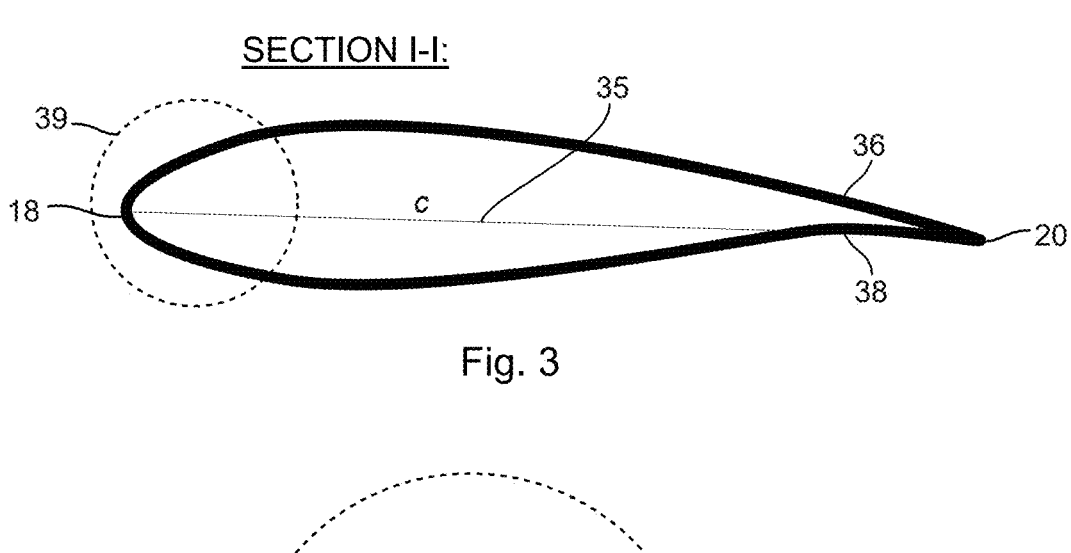
FIG. 3 illustrates a wind turbine blade airfoil.

FIG. 3 illustrates a schematic view of the airfoil corresponding to the cross-section I-I indicated in FIG. 2. FIG. 3 illustrates the pressure side shell part 36, suction side shell part 38, leading edge 18, and trailing edge 20. To illustrate embodiments of the invention, the following description will relate to the airfoil portion 39 indicated in FIG. 3. FIG. 3 also illustrates the chord 35 of the airfoil. The chord has a length c.

Figure 4:
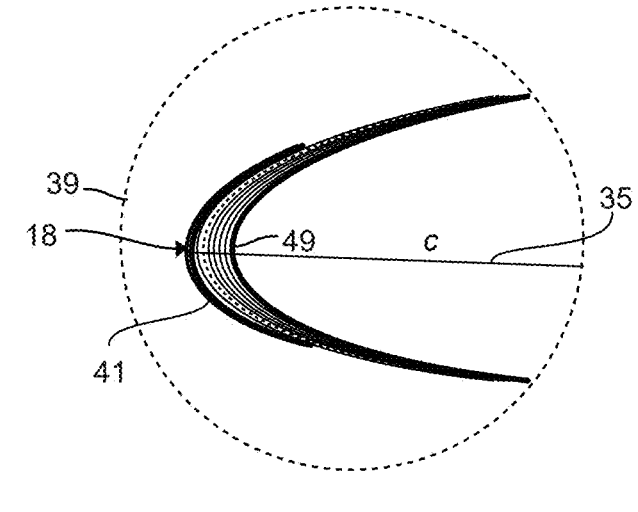
FIG. 4 illustrates an airfoil portion.

FIG. 4 illustrates a schematic view of the airfoil portion 39 indicated in FIG. 3 in more detail. The airfoil portion 39 of the blade comprises a number of layers along the chord 35 from the leading edge 18 towards the trailing edge 20. Together, these layers form the shell in the airfoil portion 39. In the present example, a corrosion protection layer 41 forms the leading edge 18. A number of layers following in the direction toward the trailing edge 20 end with an inner skin 49 that is part of an inner surface of the wind turbine blade.

Figure 5:
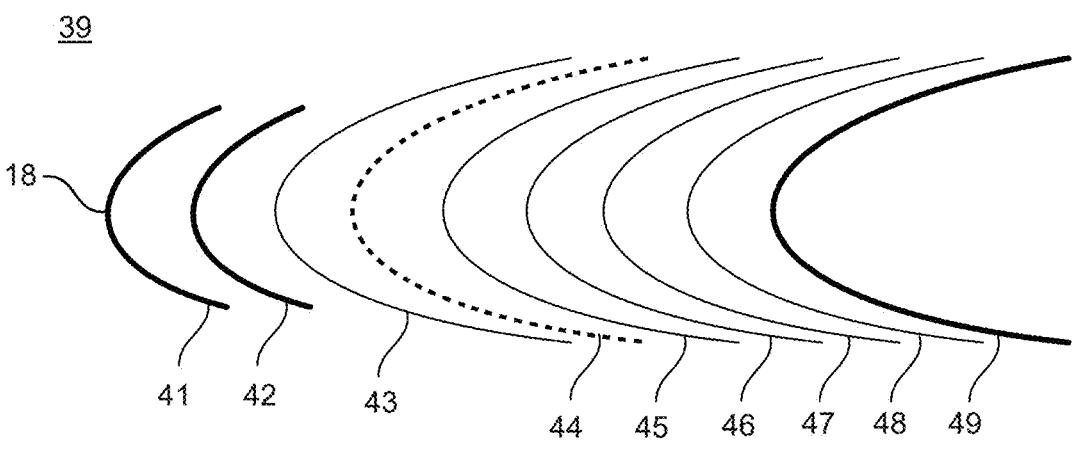
FIG. 5 is an exploded view of the airfoil portion shown in FIG. 4.

Exemplary layers are described in more detail in FIG. 5, which shows the layers in an exploded view.

FIG. 5 illustrates an exploded view of the layers forming the airfoil portion 39 shown in FIGS. 3 and 4. As described above, a corrosion protection layer 41 forms the leading edge 18 of the blade for the airfoil portion 39 shown in FIGS. 3 and 4. In the present example, the corrosion protection layer 41 covers a first electrically insulating layer 42. The next layer is a coating 43, such as a gelcoat. The first electrically insulating layer 42 may be attached to the coating 43 for instance using a pressure-sensitive adhesive. The coating 43 typically covers most of the blade 10 and is usually provided when the blade pressure side and suction side shell parts 36 and 38 are formed in moulds. Thus, the coating 43 is often the outermost layer on the shell parts once these have been formed in moulds. As part of the shell parts, a conductive metal mesh 44, made for instance of copper or a copper alloy or aluminium, is provided as part of a lightning protection system.

The layers 43-49 are provided as part of each of the shell parts 36 and 38, and the two shell parts are glued together afterwards. A glue line and the separate nature of the layers 43-49 are not illustrated and is not essential for the invention.

The metal mesh 44 extends along a part of the longitudinal axis of the blade 10, such as about the outermost 20-40% of the blade. The metal mesh 44 aids in preventing lightning from striking blade parts that are more likely to be significantly damaged by lightning current, such as carbon fibre reinforced composite material, such as carbon fibre reinforced spar caps in the blade. In the present example, a heating element 48 in the form of a heating mat is located next to an inner skin 49. The heating mat 48 is made of a resistive material that creates heat when a voltage is applied to it. This may increase the temperature at the leading edge 18 such that ice and snow will be unable to build up near the leading edge 18 of the blade. If a layer of ice or snow is allowed to build up, the forces and moments acting on the blade root and on the wind turbine hub may accelerate wear. Also, build-up of ice or snow compromises the aerodynamic properties of the blade, for instance by reducing the lift coefficient and/or increasing drag.

In this example, a woven fibre composite layer 45 is located behind the metal mesh 44, and a biaxial carbon fibre composite layer 46 is located behind the woven fibre composite layer 45.

A second electrically insulating layer 47, made for instance from polyethylene terephthalate (PET), ensures electrical isolation of the heating mat 48 from the metal mesh 44.

Together, the layers 41-49 form the airfoil portion 39 of the airfoil shown in FIGS. 3 and 4. As described above, the layers 43-49 are typically provided in a mould and made into a composite part by infusion of resin, which binds the layers together. The first electrically insulating layer 42 is added on the coating after the composite part has been made, and the corrosion protection layer 41 is added as the final layer.

Figure 6:
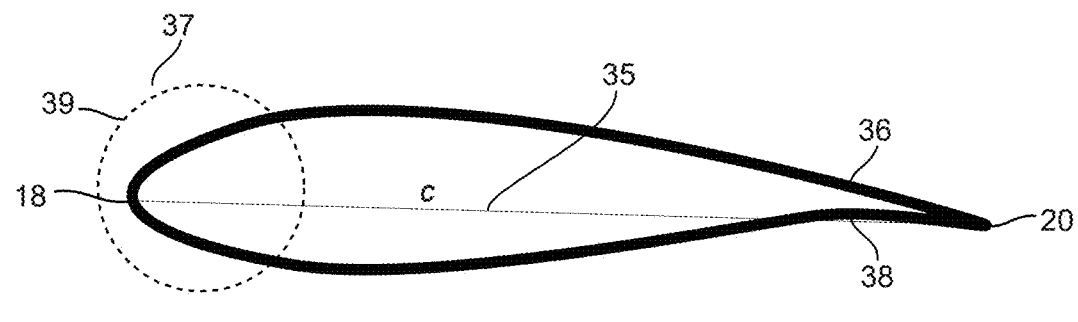
FIG. 6 illustrates a position of an exemplary lightning strike on the airfoil shown in FIG. 3.
Figures 7A, 7B:
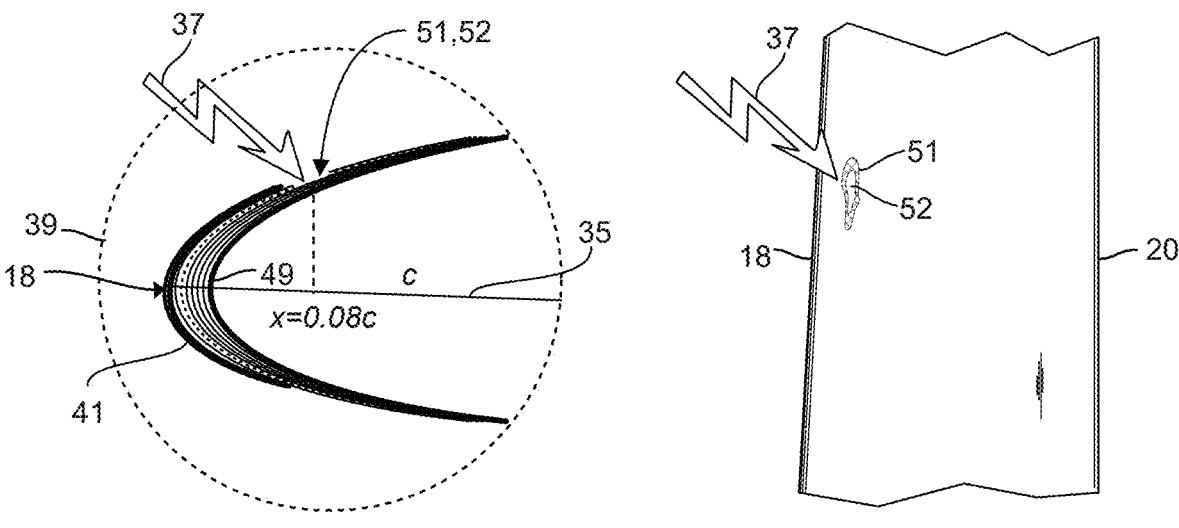
FIG. 7A illustrates the position of the exemplary lightning strike in more detail.
FIG. 7B illustrates the position of the exemplary lightning strike in more detail.
Figure 8:
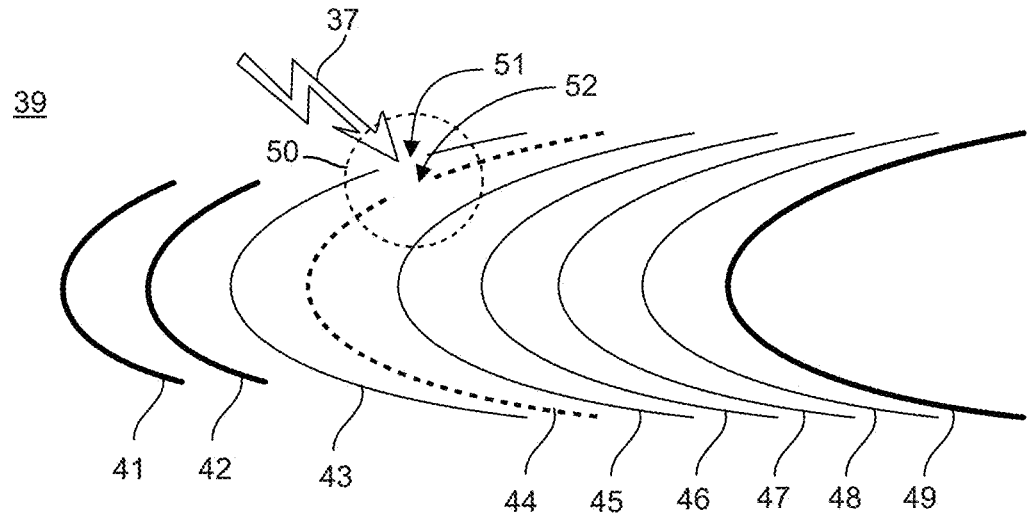
FIG. 8 is an exploded view of the airfoil portion at the end of the exemplary lightning strike.

FIGS. 6-8 illustrate an exemplary lightning strike 37 near the leading edge 18 of the blade. FIG. 6 shows the position of the lightning strike 37 on the airfoil shown in FIGS. 3 and 4 and corresponding to cross-section I-I indicated in FIG. 2.

FIG. 7A illustrates the position of the strike in the airfoil portion 39 in more detail. As shown, the lightning strikes the coating 43 away from the corrosion protection layer 41 and the first electrically insulating layer 42 due to the electrically insulating properties of the first electrically insulating layer 42. As shown in FIG. 7A, the exemplary lightning strike damages the coating 43 and the metal mesh 44, creating damaged portions 51 and 52 in the coating 43 and the metal mesh 44, respectively. This is illustrated in more detail in FIG. 8. As shown in FIG. 7A, the lightning strikes approximately at a chordwise position of 0.08 c, where cis the length of the chord 35. The coordinate x=0 coincides with the leading edge 18 and the chordwise coordinate x=c coincides with the trailing edge 20. Thus, the chordwise distance from the leading edge 18 to the damaged portions 51, 52 is approximately 8% of the chord length c.

FIG. 7B illustrates the wind turbine blade seen from the suction side. FIG. 7B shows the damaged portions 51 and 52 in the coating 43 and in the metal mesh 44, respectively. FIG. 7B illustrates that lightning damages are often irregular. It is seen that the damage 51 in the coating 43 exposes the metal mesh 44. Further, FIG. 7B illustrates that part of the metal mesh 44 is missing as a result of the lightning strike 37, as indicated by reference 52 in FIG. 7B.

FIG. 8 is an exploded view of the layers 41-49 at the end of the lightning strike, showing the damaged portion 51 created in the coating 43 and the damaged portion 52 created in the metal mesh 44 in a region 50 of the blade. With time, such damages allow the blade to erode more quickly, and the lightning protection provided by the metal mesh 44 is reduced. The metal mesh 44 is dimensioned to weigh as little as necessary while still providing protection against lightning. Gradual damage to the metal mesh may eventually result in heating in the metal mesh 44. Damages must therefore be repaired to avoid such issues, in addition to avoiding the accelerated erosion allowed by the damaged portions 51, 52.

Figure 9:
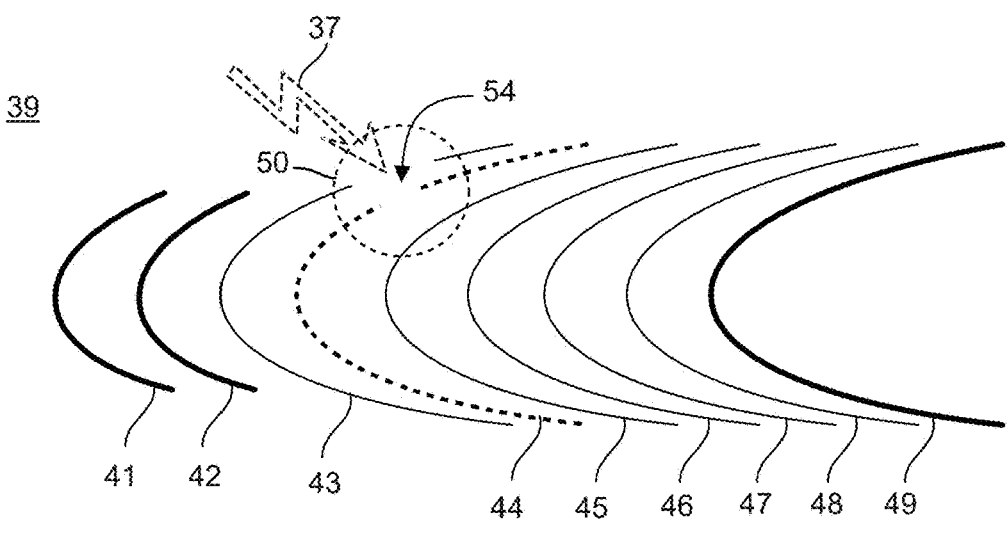
FIGS. 9-11 illustrate a repair method in accordance with the invention.
Figure 10:
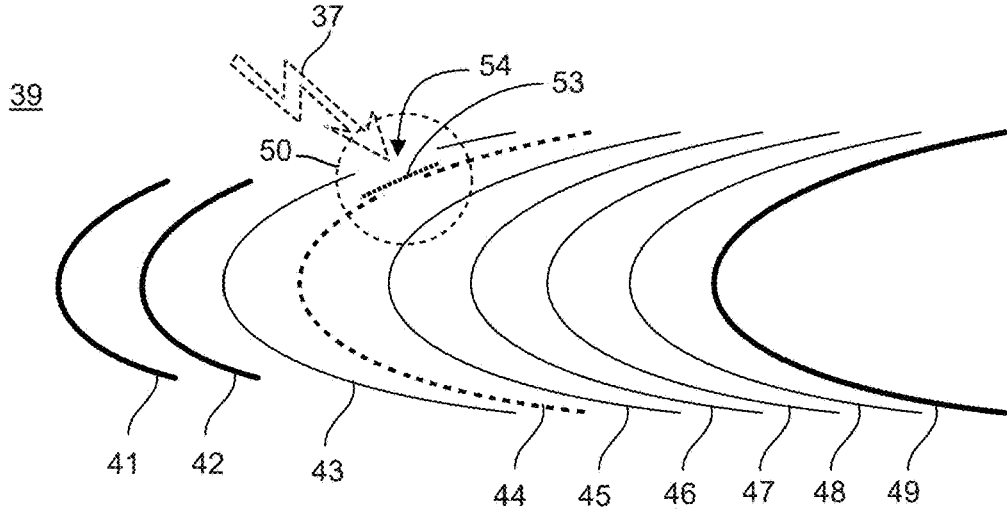
Figure 11:
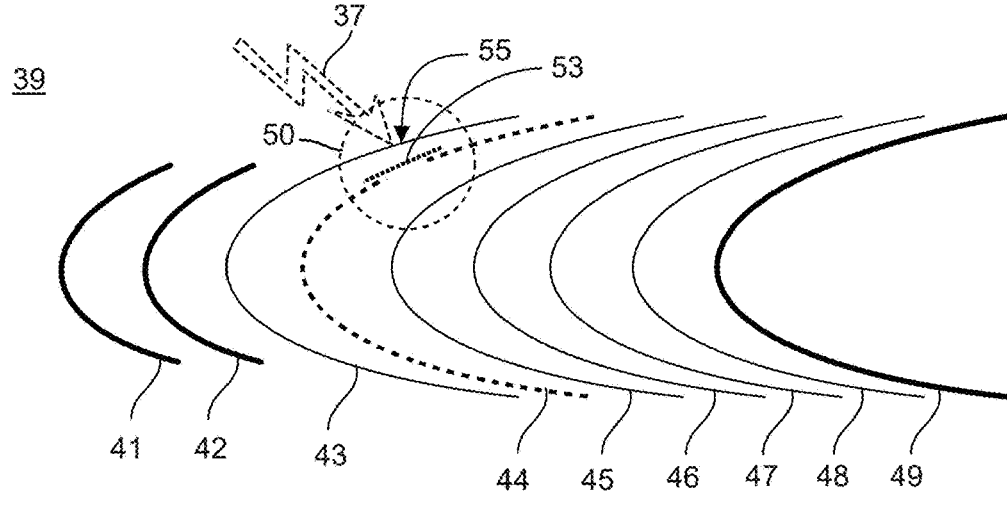

FIGS. 9-11 illustrate a repair method in accordance with the invention, consolidated in three steps. The repair method is described in further detail with reference to FIGS. 12a-12f, FIGS. 13a-13c, and FIGS. 14a-14c.

FIG. 9 illustrates the damaged portions 51 and 52 shown in FIG. 8 after an optional preparation step. The preparation step removes some material, opening up a larger region 54 in which additional coating 43 has been removed and the remaining coating around the region 54 has been prepared to provide good adhesiveness. Further, part of the metal mesh 44 has been ground away (not illustrated in FIGS. 9-11 but illustrated in relation to FIGS. 12a-12f and FIGS. 13a-13c). The latter step is typically required. During infusion, the metal mesh is embedded in resin, and thus the metal is hardly exposed after a lightning strike. By grinding away part of the metal mesh 44, the metal mesh becomes exposed, which is important for reestablishing the electrical properties of the original mesh 44.

FIG. 10 illustrates adding a new metal mesh 53 onto the damaged metal mesh 44 to replace the damaged portion 52 (see FIG. 8) of the metal mesh 44. The new metal mesh 53 acts as a patch on the damaged portion 52. In accordance with the invention, the new metal mesh 53 is attached to the metal mesh 44 using an electrically conductive adhesive (not shown in FIG. 10 but illustrated in relation to FIGS. 12a-12f and FIGS. 13a-13c). Examples of suitable electrically conductive adhesives include Loctite adhesives having a relatively high conductivity, such as Loctite Ablestik 57C or Loctite Ablestik 8200C. These provide a good balance between mechanical strength, adhesiveness, and electrical conductivity. The electrically conductive adhesive fills the gaps in the new metal mesh 53 and adhesively attaches the new metal mesh 53 to the damaged metal mesh 44 with low resistance. As described above, the low resistance may be ensured by removing part of the damaged metal mesh 44 such as to expose the metal in the metal mesh layer 44.

FIG. 11 shows the final step that completes the repair. A new coating 55 is applied to replace the damaged portion 51 of the coating 43 resulting from the lightning strike 37 and any coating 43 removed in relation to preparation of the region 50 for repair, described in relation to FIG. 9 above.

The result of the repair method described above in relation to FIGS. 9-11 is that the blade has essentially the same properties in the region 50 as before the lightning strike 37.

In the following, the repair method is illustrated in further detail with reference to FIGS. 12a-12f.

Figure 12A:
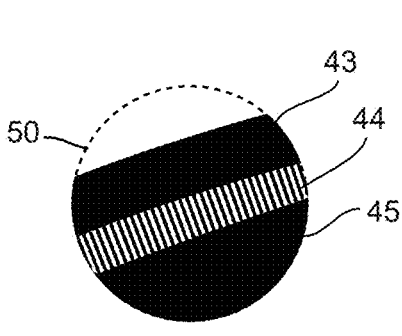
FIGS. 12a-12f illustrate the repair method in further detail.

FIG. 12a shows the intact region 50 before the lightning strike 37. As seen, the coating 43, the metal mesh 44, and the woven fibre composite layer 45 behind the metal mesh layer 44, are intact.

Figure 12B:

FIG. 12b schematically illustrates the damage created by the lightning strike 37. As described and illustrated in FIGS. 7A-8, the lightning strike 37 creates a damaged portion 51 in the coating 43 and a damaged portion 52 in the metal mesh layer 44. In this example, the woven fibre composite layer 45 is not damaged. If layers behind the metal mesh 44 are also damaged, these should be repaired before the metal mesh 44 and the coating are repaired.

Figure 12C:
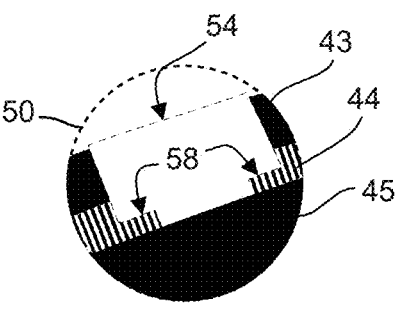

FIG. 12c illustrates preparation of the damaged regions in the coating 43 and the metal mesh 44 as part of the repair. The coating 43 is cleaned and prepared such as to provide good adhesiveness for the new coating, and the metal mesh 44 is ground to expose the metal in the metal mesh layer 44, resulting in the prepared region 54 also illustrated in FIGS. 9-10.

In the present example, grinding may provide clean metal mesh surfaces 58 in which the metal mesh 44 is exposed. As described above, during infusion, the original metal mesh 44 is embedded in resin and therefore the metal mesh proper may not be very well exposed. If not ground or similarly prepared, the amount of metal mesh 44 exposed may be insufficient for providing good contact between the metal mesh 44 and the new metal mesh 53. Thus, the metal mesh 44 is preferably prepared such as to expose a sufficient amount of metal mesh in the original metal mesh layer 44. The grinding or similar preparation also cleans the surfaces, allowing the adhesive applied in a later step (described below) to better adhere.

As shown in FIG. 12c, the grinding reduces the thickness of the metal mesh 44 in the region 54. The reduction may be kept to a minimum, or the reduction may deliberately be significant, as described in relation to FIG. 12d below.

Figure 12D:
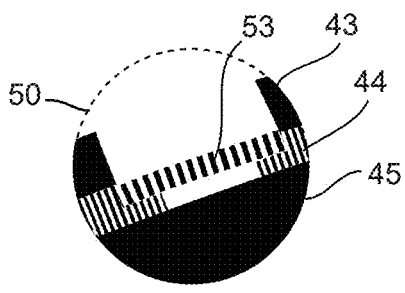

FIG. 12d illustrates addition of the new metal mesh 53 as also described in relation to FIG. 10. The new metal mesh 53 is brought into electrical contact with the damaged metal mesh 44. If the damaged metal mesh 44 has been prepared as described above and as shown in FIG. 12c, a low-resistance connection is achieved between the new metal mesh 53 and the damaged metal mesh 44. In the example in FIG. 10 and FIG. 12d, the new metal mesh 53 is dimensioned to overlap as large an area of the damaged metal mesh 44 as possible in the region 54 (region 54 is illustrated in more detail in FIG. 12c). In addition, but independently of the area of the new metal mesh 53, the thickness of the new metal mesh 53 in the present example is lower than the thickness of the damaged metal mesh. In this example, this results in a repaired metal mesh that has a thickness less than the combined thickness of the undamaged metal mesh (shown in FIG. 12a) and the thickness of the new metal mesh 53. In the example, the damaged metal mesh has been prepared and the thickness of the new metal mesh 53 been chosen such that the thickness of the repaired metal mesh substantially corresponds to the thickness of the metal mesh layer 44 before the lightning strike 37. This may improve the strength of the coating 55 added in a subsequent step, as described below and as described in relation to FIG. 11 above.

In the example in FIG. 12*d*, a space remains under the new metal mesh 53. It is also possible to add a new metal mesh in this space either in addition to the new metal mesh 53 or instead of the new metal mesh 53. The metal mesh 53 may also be bent to fit into the space. Arranging a new metal mesh as shown in FIG. 12*d* has the advantage that, as described above, metal in the metal mesh 44 is exposed at the clean metal mesh surfaces 58 (see FIG. 12*c*), resulting in good electrical contact between the new metal mesh 53 and the damaged metal mesh 44. Thus, it is preferred that a new metal mesh is added at least as shown in FIG. 12*d*.

Figure 12E:
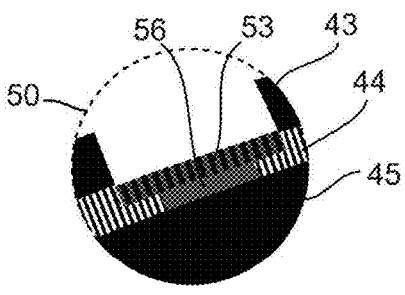

As shown in FIG. 12*e*, after adding the new metal mesh 53, an electrically conductive adhesive 56, such as one of those mentioned above, is added to adhesively attach the new metal mesh 53 to the remaining material and in particular to provide electrical connection between the new metal mesh 53 and the damaged metal mesh 44. The adhesive 56 provides strength not only by adhering to the damaged metal mesh 44 but also by adhering to the composite 45 below it, which in this example is woven fibre material embedded in resin.

The provision of adhesive 56 and the new metal mesh 53 may be performed in a combined step. For instance, an amount of adhesive may be provided before the new metal mesh 53 is inserted, and additional adhesive filling the gaps in the new metal mesh 53 may be provided after inserting the new metal mesh 53.

In an alternative approach, a significant amount of adhesive 56 is added first and then the new metal mesh 53 is inserted into the significant amount of adhesive 56. This has the advantage that air is less likely to be trapped since the adhesive will be forced through the gaps in the new metal mesh 53. Thus, the strength of the portion 50 after repair may be improved by adding the adhesive 56 first and then add the new metal mesh 53.

In another variation, which can be combined with those described above, the gaps in the new metal mesh 53 are filled with adhesive before the new metal mesh 53 is inserted. This further helps prevent air from being trapped in the repaired region and in the gaps in the new metal mesh 53.

Figure 12F:
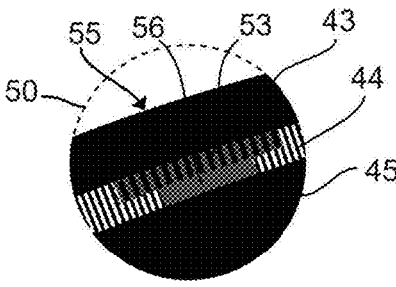

FIG. 12*f* shows completion of the repair by adding a new coating 55 in place of the coating removed by the lightning strike and, if applicable, by the preparation before the repair as described in relation to FIG. 12*c* and FIG. 9. The addition of the new coating 55 should be performed such as to achieve a smooth, flush finish to the surface of the wind turbine blade, as illustrated in FIG. 12*f*.

As seen in FIG. 12*f*, the repair results in an almost complete, if not complete, reestablishment of the electrical properties of the original metal mesh layer 44, the coating 43, and the mechanical strength in the region 50 compared to the intact region 50 shown in FIG. 12*a*.

FIG. 13*a* illustrates a different new metal mesh 63 compared to the new metal mesh 53 used in the method described above and shown in FIGS. 12*d*-12*f*. The new metal mesh 63 shown in FIG. 13*a* has the same thickness as the original metal mesh 44.

Figure 13C:
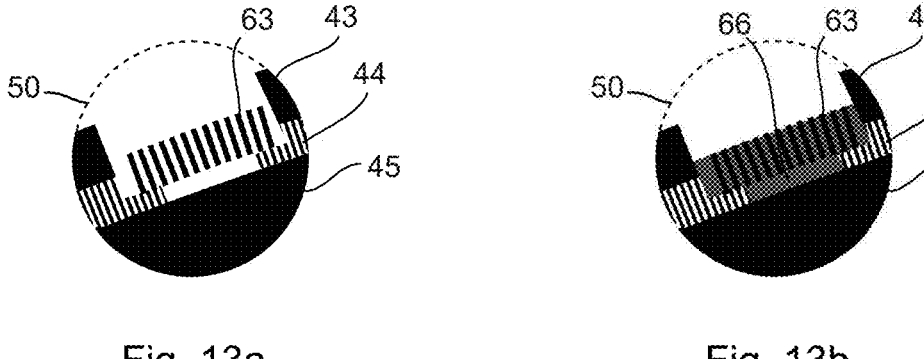
Figure 13C:
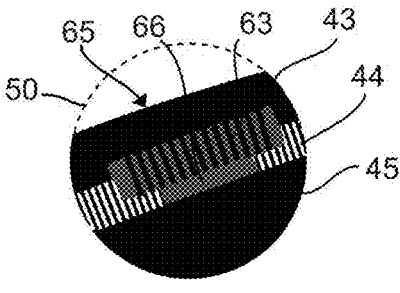

As shown in FIG. 13*b*, electrically conductive adhesive 66 is added in order to adhere the new metal mesh 63 to the damaged metal mesh 44 and to provide electrical contact between the damaged metal mesh 44 and the new metal mesh 63. This is similar to the step described above in relation to FIG. 12*e*. It can be seen from FIG. 13*b* that the resulting height of the metal mesh exceeds the thickness of the original metal mesh 44, as opposed to the embodiment described above in relation to FIGS. 12*a*-12*f*, especially FIG. 12*d*. The step of providing a new coating, as shown in FIG. 13*c*, thus results in a step in the thickness of the coating in the region 54 (illustrated in FIG. 12*c*). The thickness of the new coating 65 is lower in the area in which the new metal mesh 63 and the adhesive 66 extend above the original metal mesh layer 44. This does not necessarily have any major disadvantages. However, the different degree of thermal expansion in the different materials should be kept in mind when carrying out a repair in accordance with the invention.

FIGS. 14*a*-14*d* illustrate different applications of electrically conductive adhesive compared to FIGS. 12*a*-12*f* and 13*a*-13*c*.

Figure 14A:
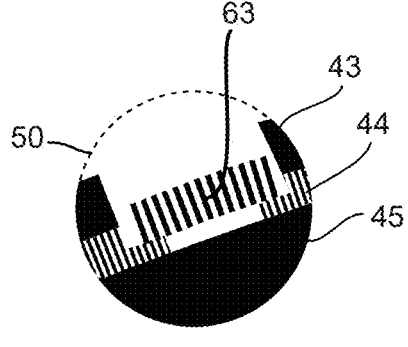
FIGS. 14a-14d illustrate another embodiment of the repair method.
Figure 14B:
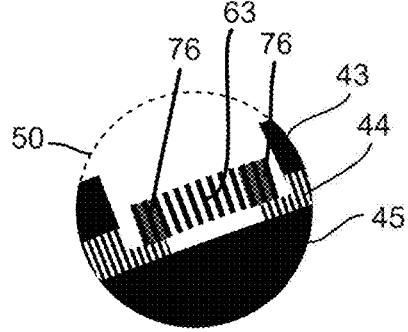

FIG. 14*a* is identical to FIG. 13*a* and illustrates a new metal mesh 63 arranged on the damaged metal mesh 44, such as in contact with clean surfaces such as the surfaces 58 shown in FIG. 12*c*.

Figure 14C:
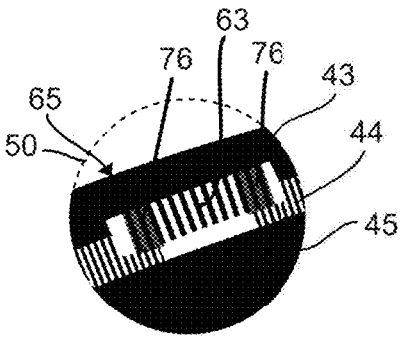
Figure 14D:
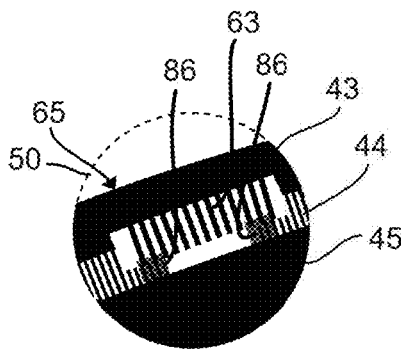

However, instead of filling all voids with the electrically conductive adhesive material, as in FIGS. 12*a*-12*f* and FIGS. 13*a*-13*c*, the method illustrated in FIGS. 14*a*-14*d* uses less electrically conductive adhesive material 76 and mostly in a region where the new metal mesh 63 contacts the damaged metal mesh 44 or, preferably, where the new metal mesh 63 contacts a cleaned metal mesh surface such as the surface 58 shown in FIG. 12*c*. This reduces the amount of electrically conductive adhesive needed, reducing cost. Filling all voids with electrically conductive adhesive is unnecessary because the new metal mesh 63 provides sufficient electrical conduction as long as the connection between the new metal mesh 63 and the damaged metal mesh 44 has a relatively low resistance. The inventors have found that overlap in the range 20-50 mm between the new metal mesh 63 (the width of each of elements 76 in FIGS. 14*b*-14*d*) and the damaged metal mesh 44 provides sufficient mechanical bonding and ensures a sufficiently low resistance when attached to one another with electrically conductive adhesive. In FIG. 14*c*, the electrically conductive adhesive 76 is provided mostly in/at the new metal mesh 63 before the new metal mesh 63 is placed in contact with the damaged metal mesh 44. FIG. 14*d* shows another embodiment in which electrically conductive adhesive 86 is provided mostly in and/or at the damaged mesh before the new metal mesh 63 is placed in contact with the damaged metal mesh 44. It is noted that the damaged metal mesh 44 usually contains cured resin from the time when the wind turbine blade part was originally manufactured, in which case the electrically conductive adhesive is essentially only on the surface of the damaged metal mesh 44. In any case, to obtain a sufficiently low resistance between the new metal mesh and the damaged metal mesh, the area of overlap between the new metal mesh and the damaged metal mesh is increased as necessary.

In various figures, including for instance FIGS. 14*c*-14*d*, white regions between coating 43 and composite layer 45 are preferable filled with coating material and/or electrically conductive adhesive and/or non-conductive adhesive. To better illustrate the first and second meshes and the electrically conductive adhesive applied to provide electrical contact between the first and second meshes, additional coating material and/or electrically conductive adhesive and/or non-conductive adhesive, to the extent that these are provided, is not illustrated. In FIGS. 14*c* and 14*d*, the white regions between the new coating 65 (and potentially some of the old coating 43) and layer 45 (composite or other type of layer) may comprise coating material and/or electrically conductive adhesive and/or non-conductive adhesive. Using non-conductive adhesive to fill out at least a portion of the empty regions has the advantage that mechanical strength is provided while keeping the costs down compared to using electrically conductive adhesive, since non-conductive adhesive is typically significantly cheaper than electrically conductive adhesive. Due to the increased mechanical strength that it provides, the repair method preferably includes providing strengthening material in some or all void(s) in the damaged region. The strengthening material is preferably an adhesive or a combination of different adhesives applied in different regions of the damaged region. A non-conductive adhesive has the advantage of being cheaper. An electrically conductive adhesive is more expensive but may result in a lower resistance between the new metal mesh and the damaged metal mesh. By using conductive and non-conductive adhesives, a balance can be struck that takes advantage of the cheapness of the non-conductive adhesive and the electrical conductivity of the electrically conductive adhesive.

The additional coating material and/or electrically conductive adhesive and/or non-conductive adhesive, if provided to fill out the areas where there is no other material except for instance air, may be provided deliberately or "automatically", depending on the way the adhesive(s) and/or coating is applied and/or on their viscosities, surface tension, temperature(s); and/or on the orientation of the different parts during the repair, the orientation affecting the direction in which gravity acts on the adhesive and/or coating. Other factors may play a role as well. Any displacement of non-cured adhesive taking place due to these factors or as a result of the new metal mesh being applied onto the damaged metal mesh is not indicated in the figures.

In some repairs, the metal mesh 44 is damaged not because of a lightning strike, but because a part of the blade below the metal mesh 44 needs repair. In that case, a cavity must be formed in order to access the region to be repaired. For instance, an air pocket may have been left due to incomplete impregnation during infusion of resin in the manufacturing of one of the wind turbine blade shell parts 36, 38. After the manufacturing, air pockets may be identified for instance using an ultrasound scanner. Since the metal mesh is embedded close to the surface of the wind turbine blade (see e.g. FIG. 5 and corresponding description), it will be necessary to also remove part of the metal mesh 44 in order to access and reinforce the air pocket. Other issues may warrant a repair and require removing part of the wind turbine blade part, including part of a metal mesh. Embodiments of the present invention contribute to reestablishing the electrical properties of the original metal mesh layer 44, the coating 43, and the mechanical strength in the damaged region.

Figure 15A:
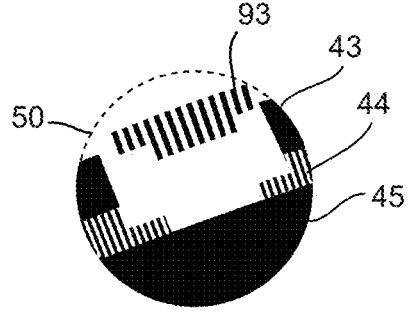
FIGS. 15a-15c illustrate another embodiment of the repair method.
Figure 15B:
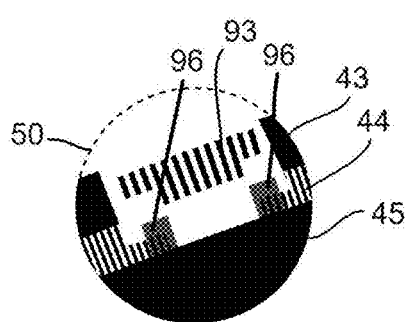
Figure 15C:
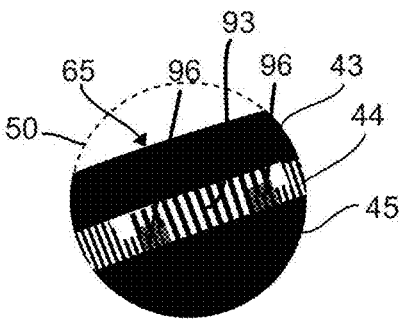

FIGS. 15a-15c illustrate another way of providing a new metal mesh 93 to a damaged metal mesh 44. In this embodiment, as seen in FIG. 15a, the new metal mesh 93 is prepared to have i) a part corresponding to the defect in the damaged metal mesh 44 and ii) a part surrounding the part corresponding to the defect in the damaged metal mesh 44. The part of new metal mesh 93 that corresponds to the defect is thicker so as to at least partly fit into the defect and, at least to some extent, provide metal mesh within the defect, thereby replacing at least some of the missing metal mesh. As shown in FIGS. 15a-15c, the part that surrounds the part corresponding to the defect has a reduced thickness. In this way, part of the defect can be filled by metal mesh while it is avoided that the total thickness of the repaired mesh exceeds the thickness that the original metal mesh 44 had before the damage. This embodiment can be seen as an alternative way to that in FIGS. 12a-12f of providing a repaired mesh layer having a thickness close to or equal to the thickness of the original metal mesh 44.

FIG. 15b shows electrically conductive adhesive 96 applied in electrical contact with the damaged metal mesh 44. As discussed in relation to FIGS. 14c-14d, it may or may not be possible to apply adhesive in the damaged metal mesh 44 due to presence of cured resin. In that case, electrically conductive adhesive is provided on top of the damaged metal mesh 44 and/or on the new metal mesh 93 in such a way that good electrical contact and mechanical strength is obtained when the new metal mesh 93 is applied to repair the damage. Electrically conductive adhesive or other adhesive could be applied to further increase the strength, as discussed above.

FIG. 15c illustrates the result of the repair. A new coating 65 has also been applied in order to provide an aerodynamic surface in the damaged region. The repair results in an almost complete, if not complete, reestablishment of the electrical properties of the original metal mesh layer 44, the coating 43, and the mechanical strength in the region 50 compared to the intact region 50 shown in FIG. 12a.

LIST OF REFERENCES 2 wind turbine
4 tower
6 nacelle
8 hub
10 blade
11,12 blade shell part
14 blade tip
15 tip end
16 blade root
18 leading edge
20 trailing edge
30 root region
31 root end
32 transition region
34 airfoil region
35 chord
36 pressure side shell part
37 lightning strike
38 suction side shell part
39 airfoil portion
40 shoulder
41 corrosion protection layer
42 first electrically insulating layer
43 coating
44 metal mesh, metal mesh layer
45 woven fibre composite layer
46 biaxial carbon fibre composite layer
47 second electrically insulating layer
48 heating mat
49 inner skin
50 damage/intact region
51 damaged portion of coating
52 damaged portion of metal mesh
53 new metal mesh, patch
54 clean/prepared region
55 new coating
56 electrically conductive adhesive
58 clean metal mesh surface
63 new metal mesh
65 new coating
66 electrically conductive adhesive 73 new metal mesh
76 electrically conductive adhesive
86 electrically conductive adhesive
93 new metal mesh
96 electrically conductive adhesive
$L_B$ length/longitudinal axis of blade
c local chord length

The invention claimed is:

1. A method for repairing a wind turbine blade part, the method comprising:

exposing a first metal mesh comprised in the wind turbine blade part;

adhesively attaching a second metal mesh to the first metal mesh using an electrically conductive adhesive, such that the second metal mesh at least partially overlaps the first metal mesh;

covering the second metal mesh with a cover material to repair the wind turbine blade part, the cover material comprising at least one of a fiber-reinforcement material or a coating;

wherein the exposed first metal mesh comprises a defect, the method further comprising covering at least the defect with the second metal mesh to patch the defect; and wherein at least one of a thickness of at least part of the exposed first metal mesh or a thickness of the second metal mesh is reduced by 20-80%.

2. The method of claim 1, further comprising:

reducing the thickness of at least part of the exposed first metal mesh around the defect to produce an area in which the first metal mesh has a reduced thickness;

providing the second metal mesh in a size that corresponds to the defect and at least part of the area in which the first metal mesh has the reduced thickness; and attaching the second metal mesh overlapping the defect and the at least part of the area of the reduced thickness, thereby obtaining a patched area having a thickness that is smaller than a combined thickness of the first metal mesh and the second metal mesh before reducing the thickness of the first metal mesh around the defect.

3. The method of claim 1, wherein the second metal mesh has a part corresponding to the defect and a surrounding part that surrounds the part corresponding to the defect, the method further comprising:

reducing the thickness of the second metal mesh in one or more areas of the surrounding part; and attaching the second metal mesh to the first metal mesh such that the part of the second metal mesh that corresponds to the defect overlaps the defect and such that the one or more areas of the reduced thickness overlap a corresponding part of the first metal mesh outside the defect, thereby obtaining a patched area having a thickness that is smaller than a combined thickness of the first metal mesh and the second metal mesh before reducing the thickness of the second metal mesh in the one or more areas of the surrounding part of the second metal mesh.

4. The method of claim 1, wherein the wind turbine blade part comprises a portion to be repaired, the portion to be repaired being located beneath the first metal mesh, the method further comprising, before adhesively attaching the second metal mesh to the first metal mesh:

removing a part of the wind turbine blade part including a part of the first metal mesh, to expose the portion to be repaired; and repairing the portion to be repaired.

5. The method of claim 1, wherein covering the second metal mesh completes an aerodynamic profile of the wind turbine blade part in a vicinity of the first and the second metal meshes.

6. The method of claim 1, wherein covering the second metal mesh comprises at least one of:

applying one or more fiber layers and adding resin to embed the one or more fiber layers to form a composite, applying leading edge protection means on a surface of the wind turbine blade part, or applying a coating to the wind turbine blade part.

7. The method of claim 1, wherein at least one of the first metal mesh or the second metal mesh is made of copper or a copper alloy.

8. The method of claim 1, wherein the electrically conductive adhesive has an electrical resistivity which is less than $1.0 \cdot 10^{-5}$ Ohm-meter measured at 25° C.

9. The method of claim 1, wherein the wind turbine blade part comprises at least one of a wind turbine blade having a leading edge and a trailing edge or a wind turbine blade segment having a leading edge and a trailing edge.

10. The method of claim 9, wherein the exposed first metal mesh is located at a chordwise position x which is at most 25% from the leading edge (x<0.25c) of the wind turbine blade.

11. The method of claim 1, wherein the first metal mesh is part of a lightning protection system in the wind turbine blade part.

12. The method of claim 1, wherein the wind turbine blade part comprises a heating element for de-icing the wind turbine blade part.

13. The method of claim 1, further comprising providing one or more adhesives such that after covering the second metal mesh with the cover material to repair the wind turbine blade part, there are no voids in a vicinity of the second metal mesh.

14. The method of claim 1, further comprising providing one or more adhesives such that after covering the second metal mesh with the cover material to repair the wind turbine blade part, there are no voids between the cover material and the first metal mesh.

* * * * *